(12) United States Patent
Shinohara

(10) Patent No.: US 12,074,508 B2
(45) Date of Patent: Aug. 27, 2024

(54) MICROCONTROLLER WITH SLEW-RATE CONTROL CIRCUIT

(71) Applicants: Kabushiki Kaisha Toshiba, Tokyo (JP); Toshiba Electronic Devices & Storage Corporation, Tokyo (JP)

(72) Inventor: Makoto Shinohara, Kawasaki Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 17/893,010

(22) Filed: Aug. 22, 2022

(65) Prior Publication Data

US 2023/0291297 A1  Sep. 14, 2023

(30) Foreign Application Priority Data

Mar. 9, 2022 (JP) .................... 2022-036472

(51) Int. Cl.
*H02M 1/00* (2007.01)
*H02M 1/088* (2006.01)
*H02M 1/36* (2007.01)

(52) U.S. Cl.
CPC ......... *H02M 1/0029* (2021.05); *H02M 1/088* (2013.01); *H02M 1/36* (2013.01)

(58) Field of Classification Search
CPC ............ H02M 1/0003; H02M 1/0012; H02M 1/0025; H02M 1/0029; H02M 1/0032; H02M 1/0035; H02M 1/0038; H02M 1/08; H02M 1/081; H02M 1/082; H02M 1/084; H02M 1/0845; H02M 1/088; H02M 1/32; H02M 1/36; H02M 7/42; H02M 7/44; H02M 7/48; H02M 7/53; H02M 7/537; H02M 7/5387; H02M 7/53871; H02M 7/53873; H02M 7/539; H02M 7/5395; H02M 1/38; H02P 27/00; H02P 27/04; H02P 27/06; H02P 27/08–14

USPC ................ 323/223–226, 271–276, 278, 280, 323/282–286, 351; 363/16, 17, 40–43, 363/49, 50, 55–58, 123, 131–134, 147

See application file for complete search history.

(56) References Cited

U.S. PATENT DOCUMENTS

| | | | |
|---|---|---|---|
| 10,742,209 B2 * | 8/2020 | Trescases | H03K 17/687 |
| 2016/0065087 A1 | 3/2016 | Nagaoka | |
| 2018/0034456 A1 * | 2/2018 | Lee | H02M 1/088 |

FOREIGN PATENT DOCUMENTS

| | | |
|---|---|---|
| JP | 2000-278961 A | 10/2000 |
| JP | 2014-204629 A | 10/2014 |
| JP | 2020-114142 A | 7/2020 |

* cited by examiner

*Primary Examiner* — Thienvu V Tran
*Assistant Examiner* — Carlos O Rivera-Perez
(74) *Attorney, Agent, or Firm* — Maier & Maier, PLLC

(57) ABSTRACT

A microcontroller with a slew-rate control circuit according to an embodiment includes a pre-drive circuit configured to charge and discharge a gate of an output power transistor with a constant current, a measuring circuit configured to measure a transition time period during which a drain-to-source voltage of the output power transistor makes a transition between a first voltage and a second voltage, and a microprocessor. The microprocessor controls a constant current set value of the pre-drive circuit such that the transition time period is a predetermined time period.

7 Claims, 6 Drawing Sheets

MICROCONTROLLER WITH SLEW-RATE CONTROL CIRCUIT

CROSS-REFERENCE TO RELATED APPLICATIONS

This application is based upon and claims the benefit of priority from the prior Japanese Patent Application No. 2022-036472 filed in Japan on Mar. 9, 2022; the entire contents of which are incorporated herein by reference.

FIELD

Embodiments described herein relate generally to a microcontroller that charges and discharges a gate of an output power transistor with a constant current by a pre-drive circuit.

BACKGROUND

A pre-drive circuit controls an output power transistor from an off-state to an on-state (hereinafter referred to as turn-on) or from an on-state to an off-state (hereinafter referred to as turn-off) by changing a gate voltage of the output power transistor. A technique of controlling an output power transistor by using a pre-drive circuit is used for, for example, an inverter in motor control.

In order to reduce a switching loss and power current noise, it is preferable to keep a transition time period of turn-on of an output power transistor and a transition time period of turn-off of the output power transistor at a predetermined time period.

Thus, a conventional pre-drive circuit controls a charge amount of a gate of an output power transistor at a predetermined current value by using a constant current source, so that a transition time period of a drain-to-source voltage is kept constant during turn-on and turn-off.

DETAILED DESCRIPTION

A microcontroller with a slew-rate control circuit according to an embodiment includes a pre-drive circuit configured to charge and discharge a gate of at least one output power transistor with a constant current, a measuring circuit configured to measure a transition time period during which a drain-to-source voltage of the at least one output power transistor connected to the pre-drive circuit makes a transition between a first voltage and a second voltage, and a microprocessor configured to read the transition time period measured by the measuring circuit. The microprocessor controls a constant current set value of the pre-drive circuit such that the transition time period is a predetermined time period.

The embodiment will be described below with reference to the accompanying drawings.

First Embodiment (Configuration)

Figure 1:
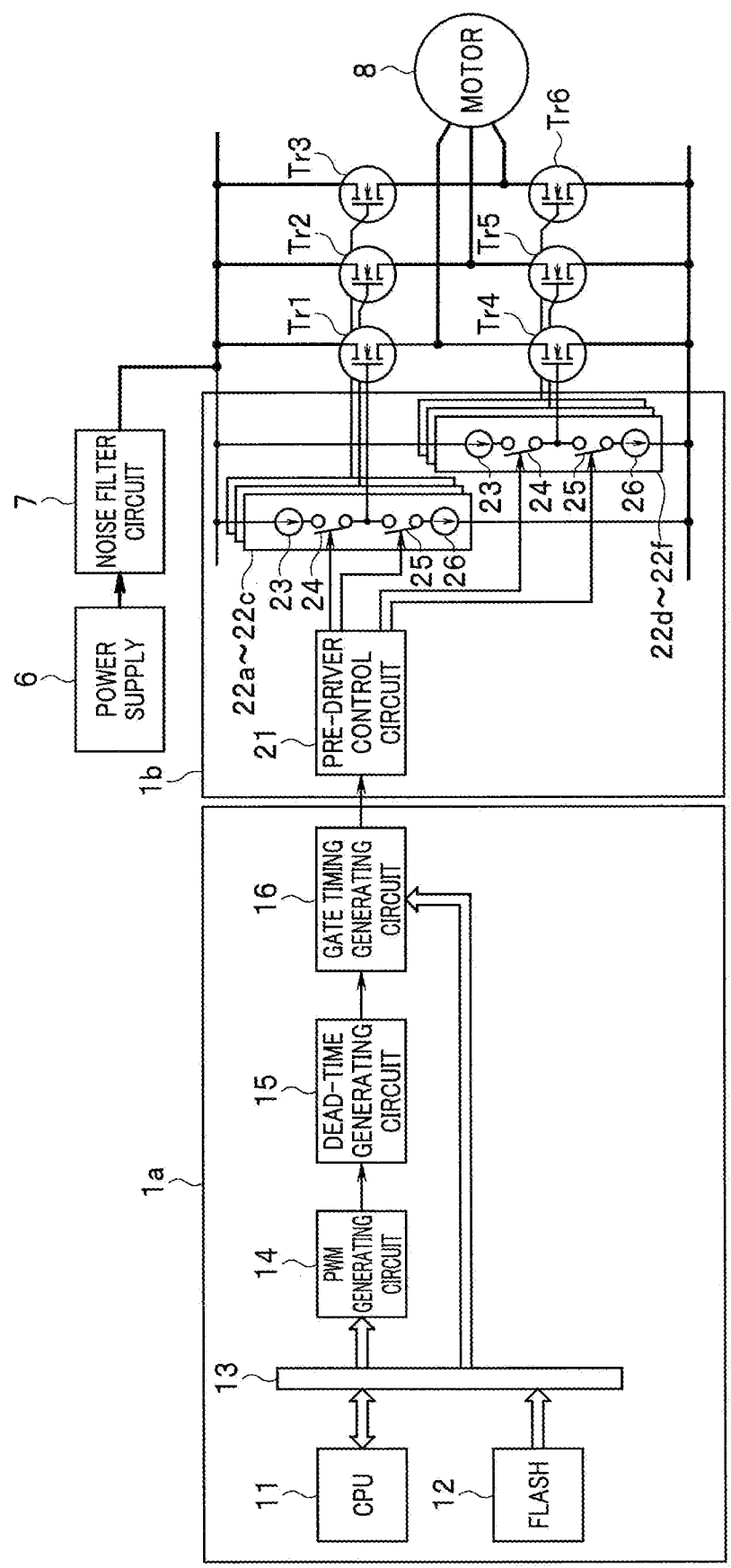
FIG. 1 is a diagram illustrating a configuration example of an inverter circuit of motor control according to a comparative example.
Figure 2:
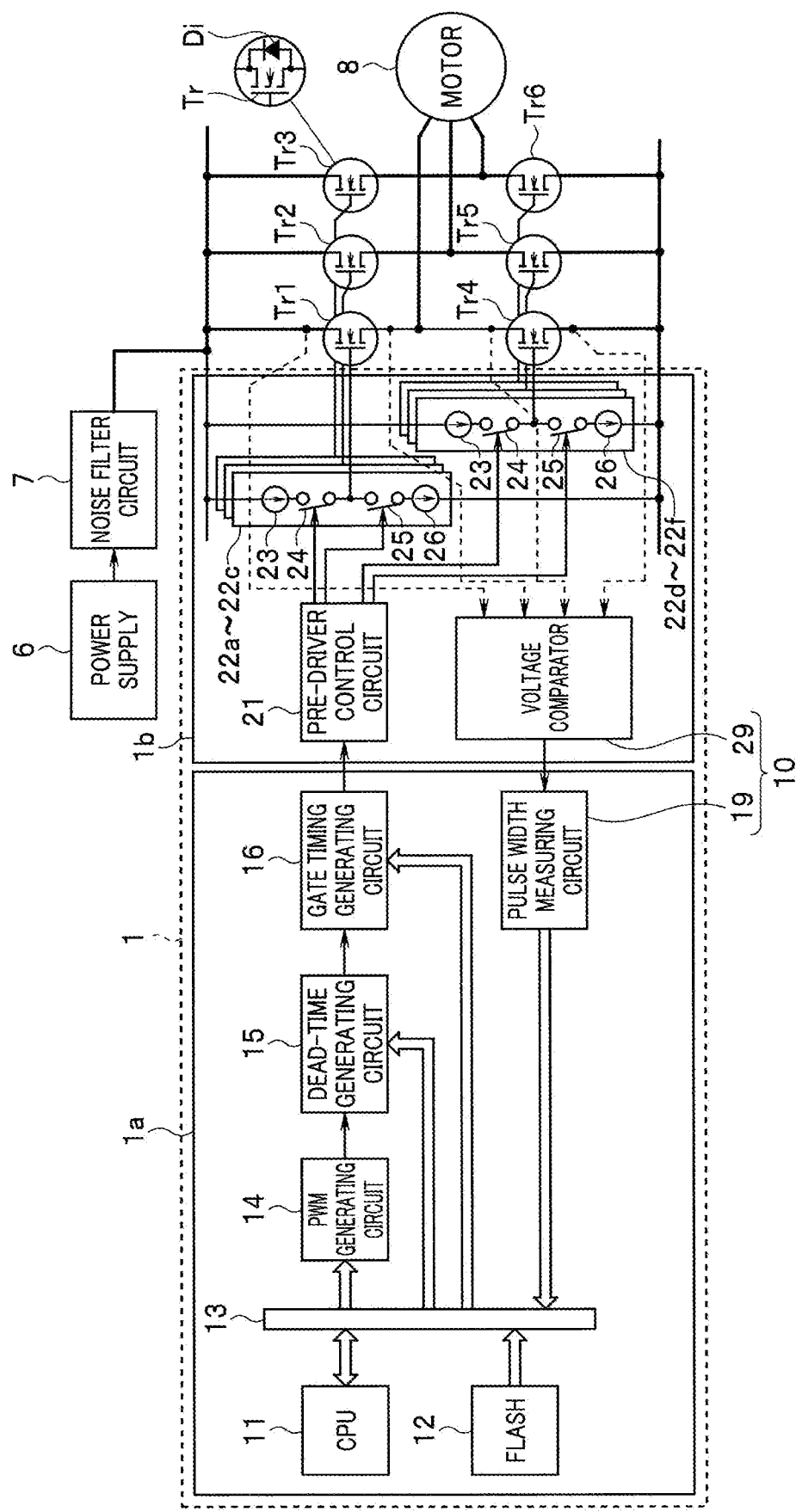
FIG. 2 is a diagram illustrating a configuration example of an inverter circuit of motor control using a microcontroller with a slew-rate control circuit according to a first embodiment.

FIG. 1 is a diagram illustrating a configuration example of an inverter circuit of motor control according to a comparative example. FIG. 2 is a diagram illustrating a configuration example of an inverter circuit of motor control using a microcontroller 1 with a slew-rate control circuit according to a first embodiment.

The circuit of the first embodiment illustrated in FIG. 2 includes the circuit of the comparative example illustrated in FIG. 1. Thus, the configuration will be described with reference to FIG. 2, and then a difference from the comparative example of FIG. 1 will be discussed.

The inverter circuit is a circuit for controlling a motor 8 and includes the microcontroller 1 with a slew-rate control circuit (hereinafter, the microcontroller 1), a power supply 6, a noise filter circuit 7, and output power transistors Tr1 to Tr6.

The output power transistor Tr1 and the output power transistor Tr4, the output power transistor Tr2 and the output power transistor Tr5, and the output power transistor Tr3 and the output power transistor Tr6 are connected in series to the power supply 6 via the noise filter circuit 7.

In the illustrated example, the motor 8 is a three-phase motor. The output power transistor Tr1 corresponds to a high side (upper layer side) of a first phase (e.g., a U phase), the output power transistor Tr4 corresponds to a low side (lower layer side) of the first phase, the output power transistor Tr2 corresponds to a high side of a second phase (e.g., a V phase), the output power transistor Tr5 corresponds to a low side of the second phase, the output power transistor Tr3 corresponds to a high side of a third phase (e.g., a W phase), and the output power transistor Tr6 corresponds to a low side of the third phase.

The inverter circuit converts a direct current, which is supplied from the power supply 6, into a pulse-width modulated alternating current by turning on/off the output power transistors Tr1 to Tr6, supplies the current to the motor 8, and drives the motor 8. More specifically, as illustrated in one of an enlarged view of FIG. 2 and FIG. 3, the output power transistors Tr1 to Tr6 each include a transistor Tr and a freewheeling diode Di connected between a drain and a source of the transistor Tr.

The noise filter circuit 7 includes, for example, a snubber circuit and reduces noise generated in power current by turning on/off the output power transistors Tr1 to Tr6.

The microcontroller 1 includes a first circuit 1a and a second circuit 1b. The first circuit 1a and the second circuit 1b may be configured as different integrated circuits. However, the microcontroller 1 in FIG. 2 may be configured as a single integrated circuit, for example.

The second circuit 1b includes a pre-driver control circuit 21, a pre-drive circuits (pre-drivers) 22a to 22f, and a voltage comparator 29.

The pre-drive circuit 22a controls on/off of the output power transistor Tr1, the pre-drive circuit 22b controls on/off of the output power transistor Tr2, the pre-drive circuit 22c controls on/off of the output power transistor Tr3, the pre-drive circuit 22d controls on/off of the output power transistor Tr4, the pre-drive circuit 22e controls on/off of the output power transistor Tr5, and the pre-drive circuit 22f controls on/off of the output power transistor Tr6.

Specifically, the pre-drive circuits 22a to 22f control the output power transistors Tr1 to Tr6 from an off-state to an on-state (hereinafter, turn-on) or from an on-state to an off-state (hereinafter, turn-off) by changing gate voltages of the output power transistors Tr1 to Tr6.

The pre-drive circuits 22a to 22f each include a constant current source 23, a turn-on switch 24, a turn-off switch 25, and a constant current source 26 that are connected in series. The turn-on switch 24 and the turn-off switch 25 each include, for example, a transistor. Between the turn-on switch 24 and the turn-off switch 25 in each of the pre-drive circuits 22a to 22f, a gate of each of the output power transistors Tr1 to Tr6 is connected.

In each of the pre-drive circuits 22a to 22f, the constant current source 23 is connected to the gate of each of the output power transistors Tr1 to Tr6 by turning on the turn-on switch 24 and turning off the turn-off switch 25, and the gate is charged with a constant current to increase a potential with substantially a constant rate of change. Moreover, in each of the pre-drive circuits 22a to 22f, the constant current source 26 is connected to the gate of each of the output power transistors Tr1 to Tr6 by turning off the turn-on switch 24 and turning on the turn-off switch 25, and the gate is discharged with a constant current to reduce a potential with substantially a constant rate of change. When the turn-on switch 24 is turned off and the turn-off switch 25 is turned off in each of the pre-drive circuits 22a to 22f, a potential of the gate of each of the output power transistors Tr1 to Tr6 is kept constant.

In this way, each of the pre-drive circuits 22a to 22f controls an amount of charge at the gate of each of the output power transistors Tr1 to Tr6 by using the constant current sources 23 and 26 (charge and discharge with a constant current), so that a transition time period tRISE (see FIG. 5) of a drain-to-source voltage Vds has a value close to a design value (predetermined time period) during turn-on and turn-off.

The pre-driver control circuit 21 controls the pre-drive circuits 22a to 22f to turn on/off the output power transistors Tr1 to Tr6 respectively.

The voltage comparator 29 compares the drain-to-source voltage Vds of each of the output power transistors Tr1 to Tr6 with a first voltage Vth1 and a second voltage Vth2 (Vth2>Vth1) and transmits a pulse signal Vdsth that provides timing when the drain-to-source voltage Vds crosses the first voltage Vth1 and timing when the drain-to-source voltage Vds crosses the second voltage Vth2.

The first circuit 1a includes a CPU (central processing unit) 11, a flash memory (flash ROM) 12, a bus 13, a PWM (pulse width modulation) generating circuit 14, a dead-time generating circuit 15, a gate timing generating circuit 16, and a pulse width measuring circuit 19.

The voltage comparator 29 and the pulse width measuring circuit 19 configure a measuring circuit 10. The measuring circuit 10 measures the transition time period tRISE (see FIG. 5) during which the drain-to-source voltage Vds of each of the output power transistors Tr1 to Tr6 connected to the pre-drive circuits 22a to 22f respectively makes a transition between the first voltage Vth1 and the second voltage Vth2.

The pulse width measuring circuit 19 receives the pulse signal Vdsth transmitted from the voltage comparator 29, converts a pulse width (time width) of the signal Vdsth into a digital value, and acquires the transition time period tRISE during which the drain-to-source voltage Vds makes a transition between the first voltage Vth1 and the second voltage Vth2.

The CPU 11 (microprocessor) reads the transition time period tRISE measured by the pulse width measuring circuit 19.

The flash memory 12 is a storage medium in which a processing program executed by the CPU 11 is stored with nonvolatility. The processing program stored in the flash memory 12 includes a program for performing a filter operation of a smoothing filter (see FIG. 6), which will be described later.

The bus 13 is a signal transmission path shared for transmitting and receiving data and commands among the CPU 11, the flash memory 12, the PWM generating circuit 14, the dead-time generating circuit 15, the gate timing generating circuit 16, and the pulse width measuring circuit 19.

The PWM generating circuit 14 generates a pulse-width modulation signal (PWM signal) for controlling the motor 8 and transmits the signal to the dead-time generating circuit 15 based on control of the CPU 11.

Figure 5:
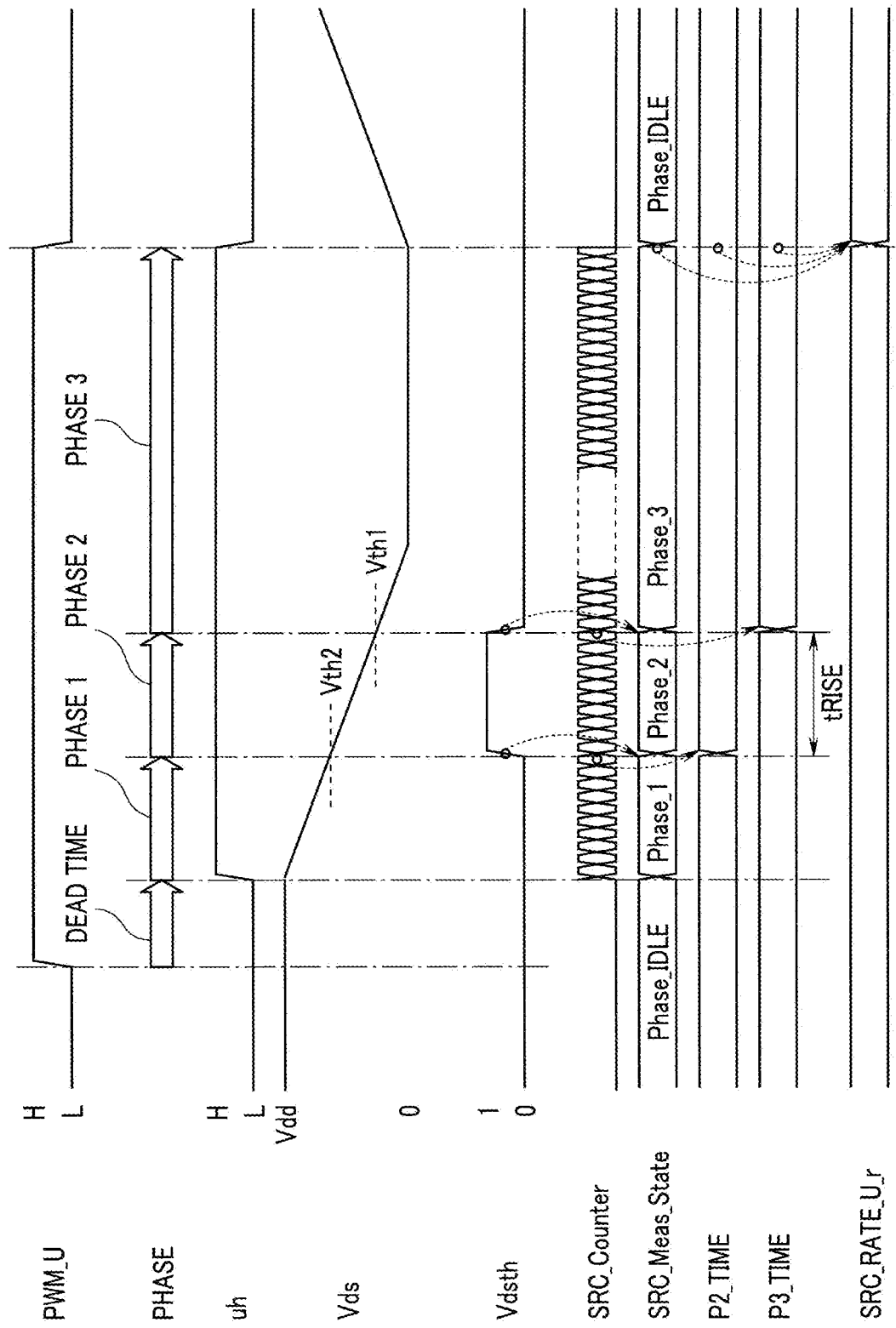
FIG. 5 is a timing chart indicating an example of operations of the inverter circuit of motor control that uses the microcontroller with the slew-rate control circuit according to the first embodiment.

The dead-time generating circuit 15 receives the PWM signal from the PWM generating circuit 14, modulates the PWM signal according to a dead time period (specifically, a rising edge of the PWM signal is delayed by the dead time period as indicated in FIG. 5) to generate a signal uh, and outputs the signal uh to the gate timing generating circuit 16. In the dead time period, the high-side output power transistor Tr1 (or one of Tr2 and Tr3) and the low-side output power transistor Tr4 (or one of Tr5 and Tr6) are prevented from conducting at the same time.

The gate timing generating circuit 16 transmits the signal uh received from the dead-time generating circuit 15, to the pre-driver control circuit 21 as a signal for controlling timing of turning on/off the gates of the output power transistors Tr1 to Tr6.

In the inverter circuit of the comparative example illustrated in FIG. 1, the measuring circuit 10 (the voltage comparator 29 and the pulse width measuring circuit 19) of the configuration in FIG. 2 is not provided, and the CPU 11 does not perform control based on a measurement result from the measuring circuit 10.

In other words, in the comparative example illustrated in FIG. 1, the constant current set values of the constant current sources 23 and 26 are fixed to a predetermined value. Thus, at the gate of each of the output power transistors Tr1 to Tr6, an amount of charge is controlled with a predetermined constant current.

However, the output power transistors Tr1 to Tr6 have individual differences and may vary in gate capacitance. Variations in gate capacitance may prevent the transition time period tRISE of the turn-on and turn-off of each of the output power transistors Tr1 to Tr6 from being kept at a design value even if an amount of charge at the gate is controlled to a fixed constant current.

Moreover, the characteristics of the output power transistors Tr1 to Tr6 may change according to a temperature change. When the characteristics change, the transition time period tRISE of the turn-on and turn-off of each of the output power transistors Tr1 to Tr6 may be prevented from being kept at the design value even if an amount of charge at the gate is controlled to the fixed constant current.

For example, when the transition time period tRISE of the turn-on and turn-off becomes shorter than the design value, a power loss caused by switching (switching loss) decreases. However, the transition time period tRISE shorter than the design value causes ringing in power current, and the generated ringing acts as a noise source, so that the noise filter circuit 7 needs to have a larger circuit size.

When the transition time period tRISE of the turn-on and turn-off becomes longer than the design value, ringing in power current decreases but a switching loss increases.

To address this point, the configuration illustrated in FIG. 2 according to the present embodiment keeps the transition time period tRISE of the turn-on and turn-off of each of the output power transistors Tr1 to Tr6 at the design value even if the output power transistors Tr1 to Tr6 vary in gate capacitance or a temperature change.

Figure 3:
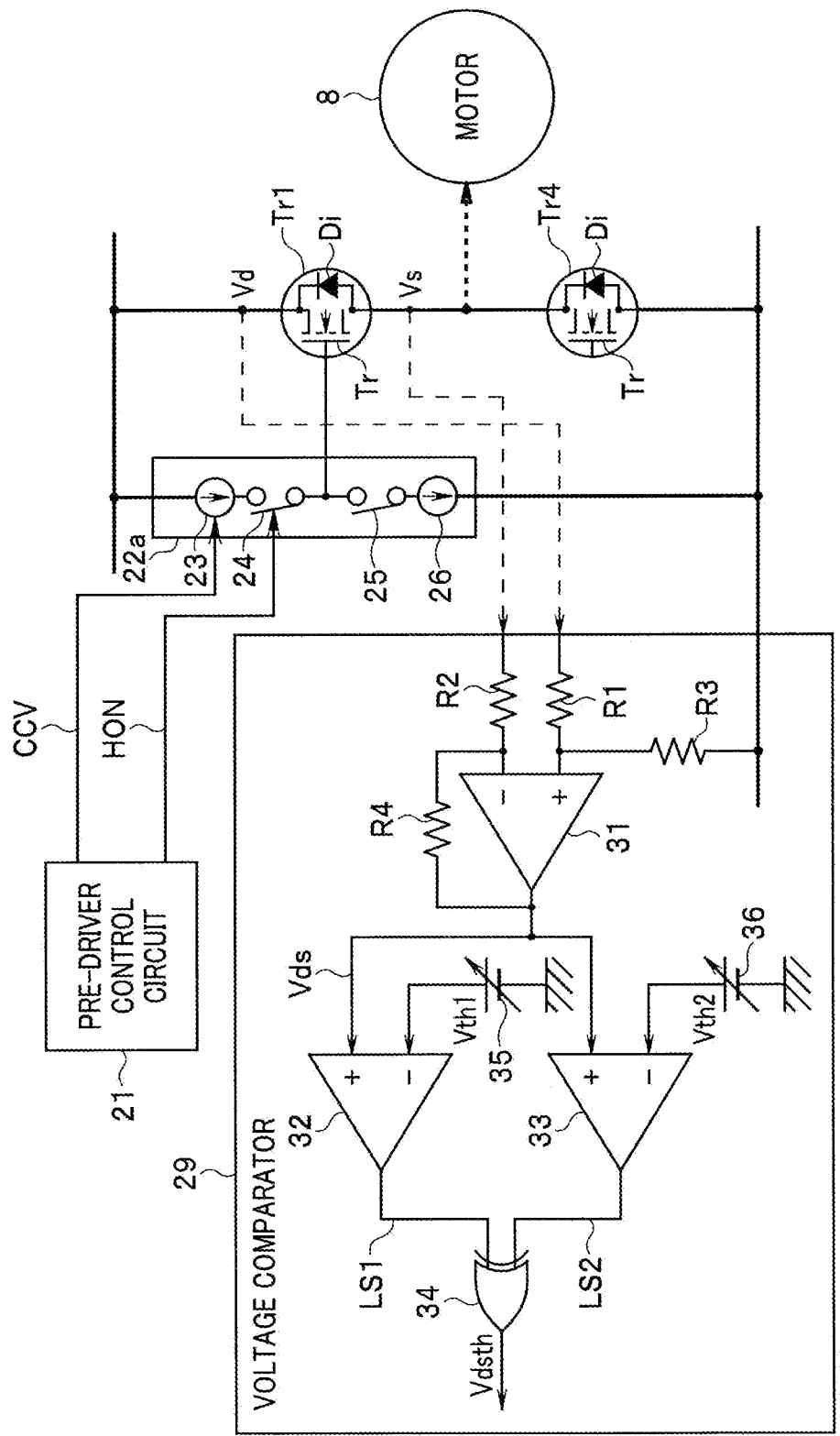
FIG. 3 is a diagram illustrating a configuration example of a voltage comparator according to the first embodiment.
Figure 4:
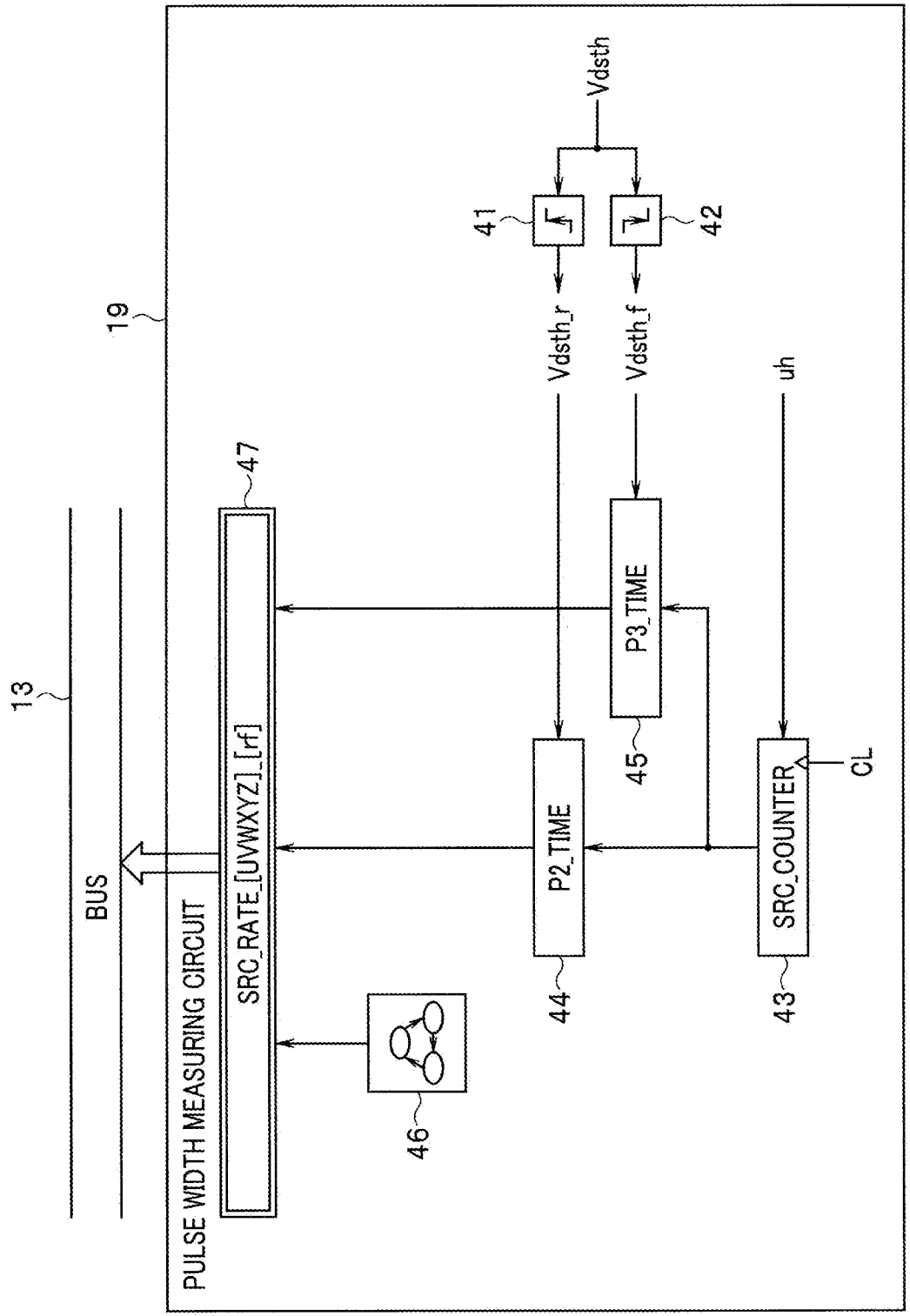
FIG. 4 is a diagram illustrating a configuration example of a pulse width measuring circuit according to the first embodiment.

Referring to FIGS. 3 and 4, a configuration of the measuring circuit 10 according to the present embodiment will be further described below. FIG. 3 is a diagram illustrating a configuration example of the voltage comparator 29 according to the first embodiment.

In FIG. 3, the output power transistors Tr1 and Tr4 of the first phase are illustrated and the output power transistors Tr2, Tr3, Tr5, and Tr6 of other phases are omitted to simplify the illustration. Furthermore, in FIG. 3, the high-side pre-drive circuit 22a of the first phase is illustrated and the other pre-drive circuits 22b to 22f are omitted.

In FIGS. 3 to 5, a turn-on side of a high side of the first phase is described, whereas a description about a turn-on side of a low side of the first phase and a description about a turn-off side of the high side and the low side of the first phase are omitted. Furthermore, descriptions about other phases are also omitted. The omitted parts would be understood as in the description about the turn-on side of the high side of the first phase.

The dead-time generating circuit 15 receives the PWM signal (PWM_U in FIG. 5) from the PWM generating circuit 14, generates the signal uh that rises after a lapse of a dead-time period from the rising edge of the PWM signal, and transmits the signal as a high-side control signal of the first phase (e.g., the U phase) to the gate timing generating circuit 16. The signal uh falls at same timing as a falling edge of the PWM signal. The dead-time generating circuit 15 also transmits the signal uh to the pulse width measuring circuit 19.

The gate timing generating circuit 16 receives the signal uh from the dead-time generating circuit 15 and transmits the signal uh to the pre-driver control circuit 21 as a signal for controlling the timing of turning on/off the gate of the output power transistor Tr1.

The pre-driver control circuit 21 generates a high-side turn-on signal HON based on the received signal uh and controls the turn-on switch 24 by the high-side turn-on signal HON.

When the signal uh is at a low level L and the output power transistor Tr1 is off, the drain-to-source voltage Vds of the output power transistor Tr1 has a constant value (e.g., a power supply voltage Vdd (or a value close to the power supply voltage Vdd)) as indicated in FIG. 5.

When the signal uh is at a high level H and the turn-on switch 24 is turned on in response to the high-side turn-on signal HON, a transition is made from the dead-time period (included in an idle phase) to phase 1 (Phase and SRC_Meas_State in FIG. 5). After the transition to phase 1, the constant current source 23 is connected to the gate of the output power transistor Tr1, the gate is charged with a constant current, and the voltage of the gate gradually increases. As the voltage of the gate increases, a resistance value between the drain and the source of the output power transistor Tr1 decreases, so that the drain-to-source voltage Vds gradually falls from the power supply voltage Vdd as indicated in FIG. 5.

When the drain-to-source voltage Vds falls to or below the second voltage Vth2, a transition is made from phase 1 to phase 2. When the drain-to-source voltage Vds falls to or below the first voltage Vth1, a transition is made from phase 2 to phase 3. After a while in phase 3, the resistance value between the drain and the source becomes negligible, so that the drain-to-source voltage Vds becomes 0. When the signal uh reaches the low level L, phase 3 is completed to make a transition to the idle phase.

The drain-to-source voltage Vds of the output power transistor Tr1 is monitored by the measuring circuit 10 including the voltage comparator 29 and the pulse width measuring circuit 19.

As illustrated in FIG. 3, the voltage comparator 29 includes resistors R1 to R4, a differential device 31, a first comparator 32, a second comparator 33, an XOR circuit 34, and voltage sources 35 and 36.

A drain terminal of the output power transistor Tr1 is connected to a non-inverting input terminal of the differential device 31 via the resistor R1. A source terminal of the output power transistor Tr1 is connected to an inverting input terminal of the differential device 31 via the resistor R2. The non-inverting input terminal of the differential device 31 is connected to a low-voltage side (e.g., Vss) via the resistor R3. An output terminal of the differential device 31 is connected to the inverting input terminal of the differential device 31 via the resistor R4.

A voltage Vd of the drain terminal of the output power transistor Tr1 is inputted to the non-inverting input terminal of the differential device 31 as a first monitor signal. A voltage Vs of the source terminal of the output power transistor Tr1 is inputted to the inverting input terminal of the differential device 31 as a second monitor signal.

The differential device 31 calculates the drain-to-source voltage Vds obtained by subtracting the voltage Vs from the voltage Vd and transmits the voltage to a non-inverting input terminal of the first comparator 32 and a non-inverting input terminal of the second comparator 33.

A voltage source 35 having the first voltage Vth1 is connected to an inverting input terminal of the first comparator 32. The first comparator 32 compares the drain-to-source voltage Vds, which is inputted to the non-inverting input terminal, and the first voltage Vth1. When the drain-to-source voltage Vds is lower than the first voltage Vth1, the first comparator 32 transmits a logical signal LS1 with a logical value of 0. When the drain-to-source voltage Vds is equal to or higher than the first voltage Vth1, the first comparator 32 transmits the logical signal LS1 with a logical value of 1.

A voltage source 36 having the second voltage Vth2 (Vth2>Vth1) is connected to an inverting input terminal of the second comparator 33. The second comparator 33 compares the drain-to-source voltage Vds, which is inputted to the non-inverting input terminal, and the second voltage Vth2. When the drain-to-source voltage Vds is lower than the second voltage Vth2, the second comparator 33 transmits a logical signal LS2 with a logical value of 0. When the drain-to-source voltage Vds is equal to or higher than the second voltage Vth2, the second comparator 33 transmits the logical signal LS2 with a logical value of 1.

The logical signal LS1 transmitted from the first comparator 32 and the logical signal LS2 transmitted from the second comparator 33 are operated by the XOR circuit 34. The XOR circuit 34 transmits the signal Vdsth with a logical value of 0 when a combination of the logical signals (LS1, LS2) is one of (0, 0) and (1, 1), and transmits the signal Vdsth with a logical value of 1 when the combination is one of (0, 1) and (1, 0). However, (0, 1) is not present because Vth2 is higher than Vth1, so that the signal Vdsth has a logical value of 1 only when the combination is (1, 0).

Thus, the voltage comparator 29 outputs the pulse signal Vdsth such that the logical value is 1 (high level H) in a period during which the drain-to-source voltage Vds is equal to or higher than the first voltage Vth1 and is lower than the second voltage Vth2 (that is, a period during which the drain-to-source voltage Vds passes between the first voltage Vth1 and the second voltage Vth2) and the logical value is 0 (low level L) in a period during which the drain-to-source voltage Vds is lower than the first voltage Vth1 and a period during which the drain-to-source voltage Vds is equal to or higher than the second voltage Vth2.

FIG. 4 is a diagram illustrating a configuration example of the pulse width measuring circuit 19 according to the first embodiment.

The pulse width measuring circuit 19 includes a rising-edge detector 41, a falling-edge detector 42, an SRC counter 43, a first register 44 (P2_TIME register), a second register 45 (P3_TIME register), a pulse order monitoring circuit 46, and a third register 47 (SRC_RATE register (SRC_RATE_[UVWXYZ]_[rf])).

The rising-edge detector 41 receives the signal Vdsth transmitted from the voltage comparator 29, detects an edge where the logical value of the signal Vdsth rises from 0 to 1, and transmits a latch signal Vdsth_r at timing of the detection.

The falling-edge detector 42 receives the signal Vdsth transmitted from the voltage comparator 29, detects an edge where the logical value of the signal Vdsth falls from 1 to 0, and transmits a latch signal Vdsth_f at timing of the detection.

The SRC counter 43 receives a system clock CL and the signal uh from the dead-time generating circuit 15. The SRC counter 43 starts counting based on the system clock CL when the signal uh changes from the low level L to the high level H.

The SRC counter 43 continues counting while the signal uh is placed at the high level H (SRC_Counter in FIG. 5). Moreover, the SRC counter 43 clears the counter to 0 when the signal uh reaches the low level L.

The first register 44 holds a count value of the SRC counter 43 when receiving the latch signal Vdsth_r from the rising-edge detector 41. In other words, the first register 44 holds a count value corresponding to a time point (P2_TIME) when a transition is made from phase 1 to phase 2.

The second register 45 holds a count value of the SRC counter 43 when receiving the latch signal Vdsth_f from the falling-edge detector 42. In other words, the second register 45 holds a count value corresponding to a time point (P3_TIME) when a transition is made from phase 2 to phase 3.

The pulse order monitoring circuit 46 monitors an input of the signal Vdsth in a proper period starting from a time point when the signal uh reaches the high level H, and monitors a proper number of inputs of the signal Vdsth. The pulse order monitoring circuit 46 monitors a state indicated by SRC_Meas_State in FIG. 5. For example, at timing of completion of phase 3 (timing when the signal uh changes from the high level H to the low level L), a monitored state is stored as flag information in the third register 47 (SRC_RATE_U_r in FIG. 5). When the flag information is stored in the third register 47, a count value (a count value indicating a rising time point of the pulse signal Vdsth) stored by the first register 44 is stored as P2_TIME in the third register 47 and a count value (a count value indicating a falling time point of the pulse signal Vdsth) stored by the second register 45 is stored as P3_TIME in the third register 47.

The CPU 11 is connected to the third register 47 via the bus 13 and can read, at any time, information stored in the third register 47.

The CPU 11 reads the information stored in the third register 47 and determines whether P2_TIME and P3_TIME have been properly obtained from the flag information. If the CPU 11 determines that the values have been properly obtained, the CPU 11 calculates a difference between P2_TIME and P3_TIME as a digital value of a period during which the drain-to-source voltage Vds passes between the first voltage Vth1 and the second voltage Vth2. The calculated digital value indicates the transition time period tRISE corresponding to a pulse width (time width) at which the signal Vdsth has a logical value of 1.

Figure 6:
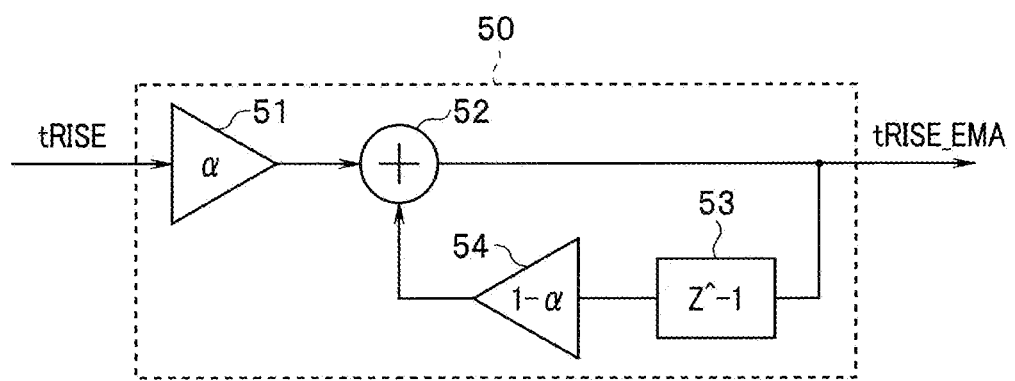
FIG. 6 is a diagram illustrating an example of an arithmetic circuit configured to smooth a transition time period according to the first embodiment.

The CPU 11 performs a filter operation for smoothing illustrated in FIG. 6, for example, on the obtained transition time period tRISE. FIG. 6 is a diagram illustrating an example of an arithmetic circuit that smooths the transition time period tRISE according to the first embodiment. In the example of FIG. 6, an EMA (exponential moving average) filter 50 is used as a smoothing filter. The CPU 11 performs operation processing, which corresponds to the arithmetic circuit in FIG. 6, via software according to a filter operation program stored in the flash memory 12, and the CPU 11 calculates a smoothed transition time period tRISE_EMA.

The EMA filter 50 includes a multiplier 51, an adder 52, a delay device 53, and a multiplier 54. The transition time period tRISE is inputted to the multiplier 51. An output of the multiplier 51 is inputted to the adder 52. An output of the adder 52 is outputted to the outside of the EMA filter 50 and is also inputted to the delay device 53. An output of the delay device 53 is inputted to the multiplier 54. An output of the multiplier 54 is inputted to the adder 52.

Hereinafter, the transition time period tRISE serving as an input to the EMA filter 50 of n cycle is denoted as x(n) and the smoothed transition time period tRISE_EMA that is outputted from the EMA filter 50 is denoted as y(n), where n represents an integer.

The multiplier 51 multiplies the input x(n) by a coefficient α and outputs α×x(n).

The delay device 53 receives an output y(n−1) of (n−1) cycle, delays the output y(n−1) by one cycle, and outputs y(n−1) in n cycle.

The multiplier 54 multiplies the output y(n−1) from the delay device 53 by a coefficient (1−α) and outputs (1−α)×y(n−1). In this case, the coefficient α multiplied by the multiplier 51 and the coefficient (1-a) multiplied by the multiplier 54 sum into 1, that is, a normalized coefficient.

The adder 52 adds α×x(n) inputted from the multiplier 51 and (1−α)×y(n−1) inputted from the multiplier 54 to obtain an output y(n) of n cycle. Thus, equation (1) is set up as follows:

$$y(n)=\alpha \times x(n)+(1-\alpha) \times y(n-1) \quad (1)$$

For example, if α=½ is selected, y(n) is an addition result of x(n) multiplied by a coefficient ½, x(n−1) multiplied by a coefficient ¼, and x(n−2) multiplied by a coefficient ⅛. . . , proving that smoothing is performed with a weight that exponentially decreases with an elapsed time from a current time point.

As described above, the CPU 11 performs smoothing via software according to the filter operation program stored in the flash memory 12, thereby flexibly responding to a specification change of a filter operation and a change of parameters. Hence, it goes without saying that the smoothing filter is not limited to an EMA filter.

The CPU 11 calculates an additional constant current value CCV such that the constant current set value decreases when the smoothed transition time period tRISE_EMA is calculated to be shorter than the design value and the constant current set value increases when the smoothed transition time period tRISE_EMA is calculated to be longer than the design value. The CPU 11 transmits the calculated constant current value CCV to the pre-driver control circuit 21 via the gate timing generating circuit 16.

The pre-driver control circuit 21 sets the received additional constant current value CCV for the constant current source 23 of the pre-drive circuit 22a. By the repeated feedback control on a slew rate, the transition time period (a time period during which the drain-to-source voltage Vds makes a transition between the first voltage Vth1 and the second voltage Vth2) tRISE of the turn-on of the output power transistor Tr1 can be kept at the design value even if the gate capacitance varies or the temperature changes.

According to the first embodiment, the CPU 11 controls the constant current set value of each of the pre-drive circuits 22a to 22f such that the transition time period tRISE during which the drain-to-source voltage Vds makes a transition between the first voltage Vth1 and the second voltage Vth2 is a predetermined time period. The control can reduce the influence of gate capacitance variations resulting from the individual differences of the output power transistors Tr1 to Tr6 and a change of characteristics due to a temperature change, thereby keeping the transition time period tRISE at the design value.

Since the transition time period tRISE is kept at the design value, noise caused by ringing of a power current can be suppressed in a certain range, thereby downsizing the noise filter circuit 7. Moreover, losses of the output power transistors Tr1 to Tr6 can be suppressed to a constant value, so that the output power transistors Tr1 to Tr6 can be used with smaller capacities than in the related art. Thus, the cost of the overall inverter circuit of motor control can be reduced.

Furthermore, a control amount of feedback control is calculated by the CPU 11, which is a microprocessor, via software, thereby reducing dedicated hardware to have a smaller circuit size and flexibly responding to a specification change or the like.

The microcontroller 1 including the first circuit Ia and the second circuit Ib is configured as a single integrated circuit, thereby achieving lower cost than a configuration including a plurality of integrated circuits and providing the inverter circuit with a simple configuration.

Second Embodiment

A second embodiment will be described below with reference to the drawings of the first embodiment. In the second embodiment, differences from the first embodiment will be mainly described.

As illustrated in FIG. 2, a CPU 11 is connected to a dead-time generating circuit 15 via a bus 13. The CPU 11 can set a dead time.

The CPU 11 calculates a minimum dead-time period (the shortest time period serving as a dead time) by estimating a time point before a pre-drive circuit 22d (or one of 22e and 22f) starts turn-on of a low-side output power transistor Tr4 (or one of Tr5 and Tr6) based on a time point of P3_TIME for a transition time period tRISE during which a pre-drive circuit 22a (or one of 22b and 22c) turns off a high-side output power transistor Tr1 (or one of Tr2 and Tr3).

Likewise, the CPU 11 calculates a minimum dead-time period (the shortest time period serving as a dead time) by estimating a time point before a pre-drive circuit 22a (or one of 22b and 22c) starts turn-on of a high-side output power transistor Tr1 (or one of Tr2 and Tr3) based on the time point of P3_TIME for the transition time period tRISE during which a pre-drive circuit 22d (or one of 22e and 22f) turns off a low-side output power transistor Tr4 (or one of Tr5 and Tr6).

P3_TIME at turn-off is a counter value when a drain-to-source voltage Vds is higher than a second voltage Vth2 (Vds>Vth2). In the case of Vds>Vth2, it is assumed that the output power transistor is substantially turned off. If high-side or low-side P3_TIME is obtained, a time point when the output power transistor is completely turned off (a time point when Vds reaches, e.g., a power supply voltage Vdd) can be estimated. If a dead time is set so as to start the turn-on of the output power transistor on the opposite side (one of a low side and a high side) at a time point when the output power transistor is completely turned off, the dead time is assumed to be a minimum dead time.

The CPU 11 sets the calculated minimum dead time in the dead-time generating circuit 15.

Thus, a dead time conventionally set at a constant value can be set at a minimum time period, thereby reducing a power loss that occurs in the output power transistors Tr1 to Tr6 during a dead-time period.

Other components and operations of the second embodiment are similar to the components and operations of the first embodiment.

According to the second embodiment, substantially the same effect can be obtained as in the first embodiment. Based on P3_TIME when one side (high side or low side) is turned off, a dead time of the turn-on of the other side (low side or high side) is set. Thus, a dead time conventionally set at a fixed value can be minimized in the second embodiment.

Furthermore, current passing through a freewheeling diode Di in a dead-time period may become a factor of power loss. In the second embodiment, the dead time is minimized so as to further reduce power loss.

While certain embodiments have been described, these embodiments have been presented by way of example only, and are not intended to limit the scope of the inventions. Indeed, the novel devices described herein may be embodied in a variety of other forms; furthermore, various omissions, substitutions and changes in the form of the devices described herein may be made without departing from the spirit of the inventions. The accompanying claims and their equivalents are intended to cover such forms or modifications as would fall within the scope and spirit of the inventions.

What is claimed is:

1. A microcontroller with a slew-rate control circuit, comprising:
   a pre-drive circuit configured to charge and discharge a gate of at least one output power transistor with a constant current;
   a measuring circuit configured to measure a transition time period during which a drain-to-source voltage of the at least one output power transistor connected to the pre-drive circuit makes a transition between a first voltage and a second voltage; and
   a microprocessor configured to read the transition time period measured by the measuring circuit,
   wherein the microprocessor
   smooths a plurality of transition time periods read over a plurality of cycles, to calculate a smoothed transition time period, and
   controls a constant current set value of the pre-drive circuit such that the constant current set value decreases when the smoothed transition time period is shorter than a predetermined time period and the constant current set value increases when the smoothed transition time period is longer than the predetermined time period.

2. The microcontroller with the slew-rate control circuit according to claim 1, wherein the at least one output power transistor includes a high-side output power transistor and a low-side output power transistor, the microprocessor further sets a dead time during which the high-side output power transistor and the low-side output power transistor connected in series to a power supply are prevented from conducting at a same time.

3. The microcontroller with the slew-rate control circuit according to claim 1, wherein the microcontroller with the slew-rate control circuit is configured with a single integrated circuit.

4. The microcontroller with the slew-rate control circuit according to claim 1, wherein the measuring circuit includes:
   a voltage comparator configured to compare the drain-to-source voltage of the at least one output power transistor with the first voltage and the second voltage, and generate a pulse signal that is placed at a low level when the drain-to-source voltage is not between the first voltage and the second voltage and is placed at a high level when the drain-to-source voltage is between the first voltage and the second voltage; and
   a pulse width measuring circuit configured to latch a rising time point and a falling time point of the pulse signal from the voltage comparator and store the rising time point and the falling time point in a register.

5. The microcontroller with the slew-rate control circuit according to claim 4, wherein the measuring circuit further includes a pulse order monitoring circuit configured to monitor that timing of input of the pulse signal and a number of the input of the pulse signal are appropriate.

6. The microcontroller with the slew-rate control circuit according to claim 1, wherein
   the at least one output power transistor comprises a high-side output power transistor and a low-side output power transistor, the high-side output power transistor and the low-side output power transistor being connected in series to a power supply,
   the pre-drive circuit is configured to charge and discharge a gate of one of the high-side output power transistor and the low-side output power transistor with a constant current,
   the measuring circuit is configured to measure the transition time period during which a drain-to-source voltage of the one of the high-side output power transistor and the low-side transistor makes a transition between a first voltage and a second voltage when the pre-drive circuit turns off the one of the high-side output power transistor and the low-side output power transistor; and
   wherein the microprocessor sets a dead time before start of turn-on of another of the high-side output power transistor and the low-side output power transistor, at a minimum time period based on the transition time period.

7. The microcontroller with the slew-rate control circuit according to claim 1, wherein the microprocessor is configured to function as an exponential moving average filter, the exponential moving average filter comprising:
   a first multiplier configured to receive the transition time period and multiply the transition time period by a first coefficient;
   an adder configured to add a first output of the first multiplier and a second output;
   a delay device configured to delay a third output of the adder by one cycle; and
   a second multiplier configured to multiply a fourth output of the delay device by a second coefficient obtained by subtracting the first coefficient from 1,
   wherein the adder adds the first output of the first multiplier and the second output of the second multiplier, to output the smoothed transition time period.

* * * * *